United States Patent
Durand et al.

(10) Patent No.: US 8,260,981 B2
(45) Date of Patent: Sep. 4, 2012

(54) DIRECT ACCESS MEMORY CONTROLLER WITH MULTIPLE SOURCES, CORRESPONDING METHOD AND COMPUTER PROGRAM

(75) Inventors: Yves Durand, Saint-Ismier (FR); Christian Bernard, Saint Etienne de Crossey (FR)

(73) Assignee: Commissariat a l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 12/890,012

(22) Filed: Sep. 24, 2010

(65) Prior Publication Data
US 2011/0087808 A1    Apr. 14, 2011

(30) Foreign Application Priority Data
Oct. 8, 2009    (FR) ...................................... 09 57033

(51) Int. Cl.
*G06F 13/28*    (2006.01)
(52) U.S. Cl. ................. 710/26; 710/22; 710/23; 710/24; 710/25; 710/27; 710/28
(58) Field of Classification Search .......... None
See application file for complete search history.

(56) References Cited

U.S. PATENT DOCUMENTS
5,901,291 A    5/1999 Feeney et al.
7,603,496 B2 *    10/2009 Wrigley et al. ................. 710/52

FOREIGN PATENT DOCUMENTS
EP    0 933 926 B1    8/1999

OTHER PUBLICATIONS

Gregory R. Andrews, "Paradigms for Process Interaction in Distributed Programs", ACM Computing surveys, vol. 23, No. 1, Mar. 1991, 42 pages.

* cited by examiner

*Primary Examiner* — Henry Tsai
*Assistant Examiner* — Jing-Yih Shyu
(74) *Attorney, Agent, or Firm* — Oblon, Spivak, McClelland, Maier & Neustadt, L.L.P.

(57) ABSTRACT

A direct memory access controller including: a transfer module that transfers data from several data sources to at least one addressee for these data, through several buffer memories each including a predetermined number of successive elementary memory locations; a read management module that reads data stored in the buffer memories and that transfers them in sequence to the addressee; and a storage module that stores read pointers associated respectively with each buffer memory, each read pointer indicating an elementary location of the buffer memory with which it is associated and in which data can be read, wherein the buffer memories are associated respectively with each data source, and for each buffer memory, the controller includes means for executing a firmware that reads data and updates a read pointer associated with this buffer memory, and for synchronising execution of the firmwares as a function of a predetermined order of data originating from buffer memories required in a data sequence to be transferred to the addressee.

8 Claims, 2 Drawing Sheets

DIRECT ACCESS MEMORY CONTROLLER WITH MULTIPLE SOURCES, CORRESPONDING METHOD AND COMPUTER PROGRAM

This invention relates to a direct memory access controller with multiple sources, a method for transferring data from several data sources to at least one addressee for these data used by this controller and a corresponding computer program.

Such a controller is called a DMA (Direct Memory Access) controller and is usually used in a data processing device with a central processing unit, for example such as an integrated circuit. It transfers data processed or supplied by one or several central processing units, being transferred from or to at least one peripheral such as a communication port, a hard disk or any memory, for example between this peripheral and one or several local memories in the device, without any intervention by the central processing unit(s) except to initiate and conclude the transfer.

For example, a DMA controller can be very useful in a system in which repeated accesses to fast peripherals could at least slow the processing done by the central unit if not block it. Its presence optimises the processing time of software applications executed by the central unit(s), leaving the DMA controller manage data transfers from and to the local memory.

BACKGROUND OF THE INVENTION

The invention is particularly applicable to a direct memory access controller for transferring data from several data sources to at least one addressee of these data, through several buffer memories each comprising a predetermined number of successive elementary memory locations, the access controller comprising a read management module designed to read data stored in the buffer memories and to transfer them in sequence to the addressee, and read pointer storage means associated respectively with each buffer memory, each read pointer indicating an elementary location of the buffer memory with which it is associated in which data can be read.

DESCRIPTION OF THE PRIOR ART

For example, such a DMA controller is described in the patent published as number U.S. Pat. No. 5,901,291. This patent states the problem that has not generally been solved, about the order in which data are transmitted by the DMA controller to the addressee while they originate from different sources that are apparently not synchronised with each other.

The solution given in this document consists of providing several buffer memories in which data are written so that they can then be read and transmitted by the DMA controller to the addressee and to supply an ordered list of these buffer memories to the DMA controller: when all the data in one of the buffer memories have been read and transmitted by the DMA controller to the addressee, reading of the next buffer memory in the ordered list is started. It is thus possible to transfer data to the addressee in a required predetermined order without any action by the central unit(s) from which these data originated.

But this solution obliges the DMA controller to manage an ordered list of buffer memories. Furthermore, even if there may be a large number of small buffer memories in this list, they cannot synchronise several sources accurately beyond a certain limit. For example, it is unreasonable to transmit interlaced data derived from two different sources in this way.

It may thus be desirable to provide a direct memory access controller to overcome the problems and constraints mentioned above.

SUMMARY OF THE INVENTION

Therefore, a subject of the invention is a direct memory access controller for transferring data from several data sources to at least one addressee for these data, through several buffer memories each comprising a predetermined number of successive elementary memory locations, the access controller comprising a read management module designed to read data stored in buffer memories and to transfer them sequentially to the addressee and read pointers storage means associated respectively with each buffer memory, each read pointer indicating an elementary location of the buffer memory with which it is associated and in which data can be read, such that the buffer memories are associated respectively with each data source, and for each buffer memory the controller comprises means of executing a firmware to read data and update the read pointer associated with this buffer memory, and it comprises means of synchronising execution of the firmwares as a function of a predetermined order of data originating from buffer memories required in the data sequence to be transferred to the addressee.

Firmware means onboard software in a hardware component such as an integrated circuit, more precisely in a volatile or non-volatile memory of this component.

Thus, by associating a firmware to read data and update a read pointer with each buffer memory itself assigned to a particular source, and by synchronising the execution of the firmwares to deterministically define the order in which data originating from the different buffer memories (therefore different sources) must be transferred to the addressee, details of the transferred sequence can be managed without needing to synchronise the DMA controller with data sources and without needing to order buffer memories with each other.

Optionally, the synchronisation means comprise means of transmitting at least one read and update right from one firmware to another, wherein temporarily holding a read and update right by one firmware currently being executed enables the latter to execute at least one data read in the buffer memory with which it is associated and at least one update of the corresponding read pointer.

Also optionally, each buffer memory is circular, each elementary location of any one of the circular buffer memories being identified by an address between a base address and a top address of this circular buffer memory, the storage means comprising write pointers associated with each circular buffer memory and each indicating an elementary location of the buffer memory with which it is associated in which data can be written, and the controller also comprises a write management module designed to write data received from sources in the corresponding circular buffer memories at the addresses indicated by the corresponding write pointers, and read, respectively write, blocking means in each circular buffer memory as a function of the relative positions of the elementary locations indicated by said read pointer and said write pointer of each circular buffer memory.

Thus, each of the circular buffer memories performs one intermediate blocking read/write buffer function between the corresponding source and the addressee. This function is managed by means of the read pointer and the write pointer associated with each circular buffer memory by the direct memory access controller that possesses write and read accesses in each circular buffer memory. In this way, it is capable of synchronising incoming data flows (flows generated by the sources) with the outgoing data flow(s) (flow(s) generated by the addressee(s)) without needing to be synchronised with a central processing unit.

Also optionally, the read blocking means in any one of the circular buffer memories are designed to block any data read in this circular buffer memory when an update to its read pointer means that the address to which it points reaches or goes beyond the address to which its write pointer points, and the write blocking means in any one of the circular buffer memories are designed to block any data write in this circular buffer memory when an update to its write pointer means that the address to which it points reaches or goes beyond the address to which its read pointer points.

Also optionally, for each circular buffer memory, the storage means also comprise a read pointer called a "working pointer", different from said read pointer associated with this circular buffer memory, this working pointer indicating an elementary location of the buffer memory with which it is associated in which data must be read, the firmware associated with this circular buffer memory also being designed to update the working pointer at each read in this circular buffer memory using a predetermined update logic.

Also optionally, the predetermined update logic for the working pointer of each circular buffer memory comprises at least one address jump in this circular buffer memory so as to read the data contained in it in an order different from that in which the data were written.

Another purpose of the invention is a method for transferring data from several data sources to at least one addressee of these data, through several buffer memories each comprising a predetermined number of successive elementary memory locations, by a direct memory access controller like that defined above, such that, each data received from any one of the sources being transmitted by a write management module to a buffer memory associated with this source and each data to be transmitted to the addressee being read in one of the buffer memories by the controller, it comprises the following steps:
for each buffer memory, execution by the controller of a firmware to read the data from this buffer memory and to update a read pointer indicating an elementary location in this buffer memory in which data can be read, and
synchronisation of execution of the firmwares as a function of a predetermined order of data derived from buffer memories required in the data sequence to be transferred to the addressee.

Optionally, the synchronisation step is done by a programmed circulation of at least one read and update right between the different firmwares currently being executed, wherein temporary holding the read and update right by one of the firmwares currently being executed enables the latter to execute at least one data read in the buffer memory with which it is associated, and at least one update of the corresponding read pointer.

Also optionally, the programmed circulation of the read and update right between the different firmwares currently being executed is done as follows:
each firmware execution comprises at least one step to wait for the read and update right according to a programmed instruction in this firmware,
each firmware execution comprises at least one step to transmit the read and update right to another firmware currently being executed after execution of at least one read and at least one update of the read pointer associated with this firmware, in accordance with a programmed instruction of this firmware.

Finally, another purpose of the invention is a computer program that can be downloaded from a communication network and/or recorded on a medium that can be read by a computer and/or executed by a direct memory access controller, including program code instructions for execution of the steps in a data transfer method like that defined above when said program is executed by a direct memory access controller.

BRIEF DESCRIPTION OF THE DRAWINGS

The invention will be better understood after reading the following description given solely as an example with reference to the appended drawings in which.

DESCRIPTION OF THE PREFERRED EMBODIMENTS

Figure 1:
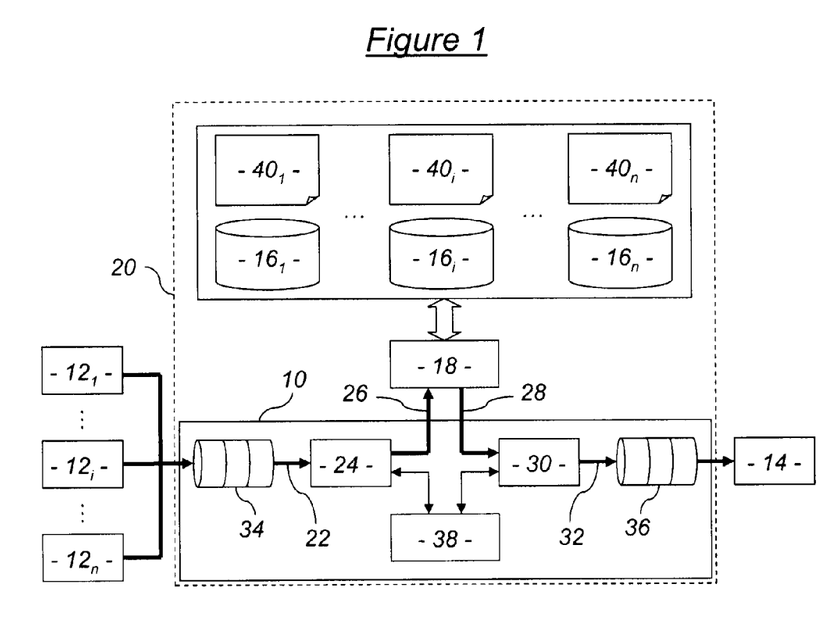
FIG. 1 diagrammatically shows the general structure of a direct memory access controller according to one embodiment of the invention,
FIG. 2 diagrammatically shows an advantageous way in which the direct memory access controller in FIG. 1 works in an interlaced data transfer application derived from two sources,
FIGS. 3A and 3B diagrammatically show circular buffer memories structure managed by the direct memory access controller in FIG. 1.

The direct memory access controller or the DMA controller 10 shown in FIG. 1 performs the function of transferring data from several data sources $12_1, \ldots, 12_i, \ldots, 12_n$ to at least one addressee 14 of these data through a plurality of buffer memories $16_1, \ldots, 16_i, \ldots, 16_n$, each comprising a predetermined number of successive elementary memory locations.

Before the invention can be used, the DMA controller 10 must be able to access each buffer memory $16_i$ in read and optionally in write. But in the example shown in FIG. 1, it is capable of accessing the elementary locations of each buffer memory $16_i$ in write and in read through a write and read data access command module 18 interfacing with the DMA controller 10 and a storage medium integrating the buffer memories $16_1, \ldots, 16_i, \ldots, 16_n$. It will be noted that in one variant embodiment, the DMA controller then marked as reference 20 includes the storage medium integrating the buffer memories $16_1, \ldots, 16_i, \ldots, 16_n$ and the write and read access command module 18. In practice, it may be in the form of a system on a standalone chip, for example a CMOS type integrated circuit.

As a non-limitative implementation example, according to one possible architecture called a NoC (Network on Chip), the DMA controller 10 or 20 is considered as being composed of functional elements communicating with each other through links in a packet switching network.

According to this architecture, the DMA controller 10 or 20 comprises the following elements to transfer data from sources $12_1, 12_i, \ldots, 12_n$ to the addressee 14:
a reception link 22 for data originating from sources $12_1, \ldots, 12_i, \ldots, 12_n$,
a module 24 that the controller 10 or 20 uses to manage writing data into buffer memories $16_1, \ldots, 16_i, \ldots, 16_n$, this module being activated by the data that it receives from the link 22,
a link 26 on which data is sent to the buffer memories $16_1, \ldots, 16_i, \ldots, 16_n$ to write these data into elementary locations of these memories through the write and read access command module 18, a link 28 on which data is received from buffer memories $16_1, \ldots, 16_i, \ldots, 16_n$ to read these data in elementary locations of these memories through the write and read access command module 18, a module 30 that the controller 10 or 20 uses to manage reading data in buffer memories $16_1, \ldots, 16_i, \ldots, 16_n$, capable of receiving data supplied by the link 28, and a link 32 on which the data read are sent to the addressee 14.

With these elements, the DMA controller 10 or 20 sends each data received from a source $12_i$ to the corresponding buffer memory $16_i$, each data that will be sent to the addressee 14 then being read in the corresponding buffer memory $16_i$ by the DMA controller 10 or 20. The buffer memories $16_1, \ldots, 16_i, \ldots, 16_n$ thus fulfil an intermediate buffer function between sources $12_1, \ldots, 12_i, \ldots, 12_n$ and the addressee 14.

It will be noted that in another possible embodiment of the invention that is not shown, as long as the DMA controller 10 does not integrate the buffer memories $16_1, \ldots, 16_i, \ldots, 16_n$ and that it does not have a data write management module 24 in the buffer memories $16_1, \ldots, 16_i, \ldots, 16_n$, in other words when it has no write access in these buffer memories, the sources $12_1, \ldots, 12_i, \ldots, 12_n$ for example form these buffer memories directly.

The buffer memories $16_1, \ldots, 16_i, \ldots, 16_n$ may be implemented in different manners known in themselves, but in one preferred embodiment they are in the form of circular buffer memories Each buffer memory $16_i$ then occupies a memory space between a base address and a top address. A read or write pointer associated with a buffer memory is incremented between the base address and the top address of this buffer memory and returns to the base address by adding an increment after reaching the top address: this qualifies these buffer memories as "circular buffer memories".

The advantage of this circular buffer memory configuration, for example of the FIFO (First In First Out) type is that it avoids memory reallocation constraints if additional data are received, since everything happens as if it were possible to write data into such a memory buffer indefinitely as long as the address to which a write pointer associated with this memory does not reach an elementary location containing data that is stored but that has not yet been read, in other words as long as the memory is not full.

In this case, the data reception link 22 optionally comprises a FIFO type input buffer memory 34, for example capable of temporarily storing data received from a source $12_i$ while the corresponding circular buffer memory $16_i$ is blocked in write because it is full.

Also optionally, the link 32 that sends read data comprises a FIFO type output buffer memory 36, for example capable of temporarily storing data read in at least one of the circular buffer memories $16_1, \ldots, 16_i, \ldots, 16_n$ while the output network is temporarily saturated or the addressee 14 is blocked in read.

The DMA controller 10 or 20 also comprises means 38 of storing circular buffer memory descriptors $16_1, \ldots, 16_i, \ldots, 16_n$, so as to enable the distribution of the incoming data flow into the latter to the addressee 14.

For each circular buffer memory $16_i$ these descriptors comprise at least one basic pointer PBi pointing to a base address of the circular buffer memory $16_i$ in its storage medium, a top pointer PSi pointing to a top address of the circular buffer memory $16_i$ in its storage medium, a write pointer PEi pointing to an address of the elementary location in the circular buffer memory $16_i$ in which the next data received by the DMA controller 10 or 20 may be written, and a read pointer PLi pointing to an address of the elementary location in the circular buffer memory $16_i$ in which next data can be read to be transmitted to the addressee 14.

Since each buffer memory $16_i$ is a circular memory for which the size is defined by the number of elementary locations included between the base and top addresses designated by pointers PBi and PSi, each elementary location of this memory to which write and read pointers PEi and PLi can point is identified by an address between the base address and the top address.

The base and top pointers PBi and PSi are predetermined and will remain constant, while the write pointer PEi, and the read pointer PLi, are variable. They may be updated by incrementing with or without address jumps subsequent to a write or read operation, in the circular buffer memory $16_i$.

As mentioned above, the circularity of each buffer memory $16_i$ depends on the fact that when its write pointer PEi or read pointer PLi reaches the top address of the memory, an increment of one elementary location of this pointer makes it point on the base address of the memory.

Figure 3A:
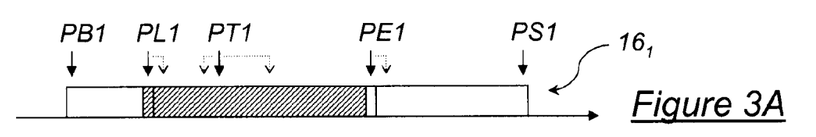
Figure 3B:
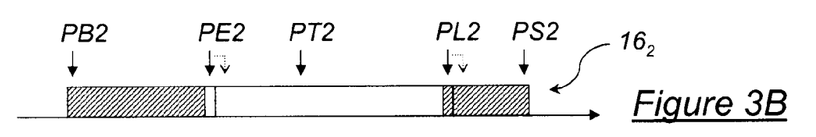

Consequently, data temporarily stored in each circular buffer memory $16_i$ while waiting to be read by the DMA controller 10 or 20 to be transmitted to the addressee 14, are located between the read pointer address PLi and the address preceding the write pointer PEi of this memory $16_i$ in the direction from the base to the top. On the other hand, the memory space located in the circular buffer memory $16_i$ between the address of its write pointer PEi and the address preceding the address of its read pointer PLi in the direction from the base to the top is a free space for write. This structure of each circular buffer memory $16_i$ associated with the PBi, PSi, PEi and PLi descriptors is shown in FIGS. 3A and 3B that will be described in detail later.

For example, more precisely, each write pointer PEi may be updated by incrementing an elementary location in the direction from the base to the top, following a write operation in the corresponding circular buffer memory $16_i$.

On the other hand, the read pointers PL1, PLi, PLn are updated by execution of firmwares $40_1, \ldots, 40_i, \ldots, 40_n$ respectively. For example, these firmwares $40_1, \ldots, 40_i, \ldots, 40_n$ are stored in the same storage medium as the circular buffer memories $16_1, 16_i, \ldots, 16_n$ and are associated with each of them respectively. They are executed by the read management module 30.

According to the invention, each firmware $40_i$ is programmed to read data and to update the read pointer PLi of the circular buffer memory $16_i$ with which it is associated. Also according to the invention, the DMA controller 10 or 20 is provided with means of synchronising execution of the firmwares $40_1, \ldots, 40_i, \ldots, 40_n$ as a function of a predetermined order of data derived from sources $12_1, \ldots, 12_i, \ldots, 12_n$, required in the data sequence to be transferred to the addressee 14.

More precisely, the synchronisation means may for example comprise means of transmitting at least one read and update right from one firmware $40_i$ to the other, wherein temporarily holding the read and update right by one of the firmwares $40_1, \ldots, 40_i, \ldots, 40_n$ currently being executed enables it to execute at least one data read in the circular buffer memory $16_i$ with which it is associated and at least one update of the corresponding read pointer PLi.

Figure 2:
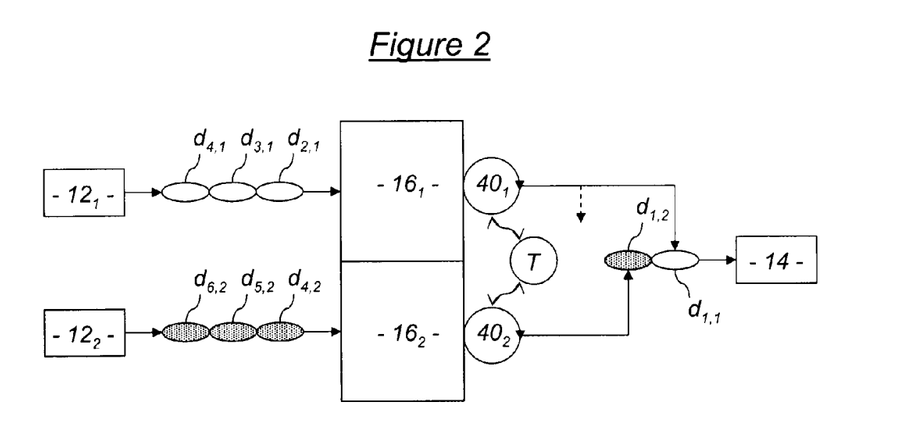

In one simple embodiment, this read and update right is unique and is called a token and is marked T in FIG. 2. The concept of a single token circulating from object to object to prevent two objects from being executed at the same time is well known in computer science and will not be described in detail. It is simulated by programming particularly using elementary waiting and token transmission functions.

In this case, circulation of the token T between the different firmwares $40_1, \ldots, 40_i, \ldots, 40_n$ currently being executed may be programmed in each firmware as follows:
- each firmware $40_i$ comprises at least one instruction to wait for the token T,
- each firmware $40_i$ comprises at least one instruction to transmit the token T to another firmware $40_i$ currently being executed after execution of at least one read in the circular buffer memory $16_i$ and at least one update of the read pointer PLi.

Therefore, the synchronisation means result from the combination of the read management module 30 and of these instructions to wait for and transmit the token integrated into the firmwares $40_1, \ldots, 40_i, \ldots, 40_n$ that the module 30 can execute.

However, the use of a single token T as a synchronisation primitive to implement a read and update right circulating between the different firmwares may be unreliable when the number of firmware programs (therefore sources) increases and when interlacing of the outgoing data becomes more complex. Careless programming of how reads are synchronised using this token may cause blockages or execution conflicts between different firmwares.

This can be corrected by implementing the read and update right by using semaphores, particularly binary semaphores qualified as being mutex (Mutual Exclusion) semaphores with one semaphore for two firmware programs. Thus, $C_N^2$ semaphores will be defined for a DMA controller with N sources. Management of conflicts between all firmwares is simplified since each semaphore is specifically exchanged between two identified firmware programs. Obviously, the token and binary semaphore concepts are equivalent for a DMA controller with two sources.

The advantageous operation of the direct memory access controller 10 or 20 in FIG. 1 is shown in FIG. 2 in a particular application that is simple but not limitative. This application is chosen only to simply demonstrate the principle of synchronisation of the data read and update firmwares $40_1, \ldots, 40_i, \ldots, 40_n$ of the associated read pointer. According to this application, a first data source $12_1$ provides a data sequence $d_{1,1}, d_{2,1}, d_{3,1}, \ldots$ to the DMA controller 10 or 20 which temporarily stores these data in the circular buffer memory $16_1$. Due to the incremental address by address update of the write pointer PE1, these data are stored in the circular buffer memory $16_1$ in the order of the sequence provided by the source $12_1$. A second data source $12_2$ provides a data sequence $d_{1,2}, d_{2,2}, d_{3,2}, \ldots$ to the DMA controller 10 or 20 that temporarily stores these data in the circular buffer memory $16_2$. Similarly, due to the incremental address by address update of the write pointer PE2, these data are stored in the circular buffer memory $16_2$ in the order of the sequence supplied by the source $12_2$. The DMA controller must then transmit data derived from the two sources $12_1$ and $12_2$ to the addressee 14, interlacing the two sequences to provide a single sequence $d_{1,1}, d_{1,2}, d_{2,1}, d_{2,2}, d_{3,1}, d_{3,2}, \ldots$ Before this output sequence is provided, regardless of the delay of one of the sources $12_1$ or $12_2$ relative to the other in the transmission of its data, the firmwares $40_1$ and $40_2$ associated with the buffer memory $16_1$ and the buffer memory $16_2$ respectively are defined as follows:

Firmware $40_1$
For i in 0 to n (number of data to be read in the memory $16_1$)
    PL1+=k; (update pointer PL1 using a predetermined increment)
    Dest=*PL1; (read data and send to addressee 14)
    Send T to $40_2$; (transmit the token/mutex to firmware $40_2$)
    Wait T; (wait for the token/mutex)
End for
Firmware $40_2$
For i in 0 to n (number of data to be read in the memory $16_2$)
    PL2+=k; (update pointer PL2 using a predetermined increment)
    Dest=*PL2; (read data and send to addressee 14)
    Send T to $40_1$; (transmit the token/mutex to firmware $40_1$)
    Wait T; (wait for the token/mutex)
End for The increment k may be equal to 1, but it may also be greater than 1 if not all of the data provided by either of the sources $12_1$ and $12_2$ need to be transmitted.

The token or mutex T thus circulates between firmwares $40_1$ and $40_2$ every time that data is read to provide the output sequence $d_{1,1}, d_{1,2}, d_{2,1}, d_{2,2}, d_{3,1}, d_{3,2}, \ldots$ even if the sources are not synchronised with each other. Furthermore, this deterministic supply of the required output sequence takes place without the DMA controller 10 or 20 being synchronised with an arbitrary microprocessor.

Since data interlacing is done using the CDMA (Code Division Multiple Access) technology or to combine two MIMO (Multiple Input Multiple Output) data frames by reading useful data while ignoring pilot data, there are many practical applications of this synchronisation of firmwares $40_1, \ldots, 40_i, \ldots, 40_n$ using the DMA controller.

It is quite obvious that the DMA controller is thus capable of simply and efficiently providing the addressee 14 with data in a predetermined order of data sources regardless of the speed at which the data sources transmit their data independently of the other sources.

In combination with this function to manage the order in which data derived from several sources are provided to the addressee, in one particular embodiment of the invention it is possible that the DMA controller could also perform an incoming and outgoing flow synchronisation function.

Before this particular embodiment can be implemented, the DMA controller must comprise the write management module 24 defined above.

In this case, the data write management module 24 is designed to enable or to block writing of data into any one of the circular buffer memories $16_i$, depending particularly on the relative values of the write pointer PEi and the read pointer PLi. It is also designed to update the write pointer PEi automatically using a sequencer, by incrementing it by one elementary location. More precisely, in one simple variant of this particular embodiment of the invention, data to be written in the circular buffer memory $16_i$ must be written at the address indicated by the write pointer PEi; writing this data must be blocked if an update to the write pointer PEi made previously by the write management module 24 is such that the address to which it points reaches or goes beyond the address to which the read pointer PLi points (memory full).

Similarly, the data read management module 30 is designed to enable or to block reading data in the circular buffer memory $16_i$ particularly as a function of the relative values of the write pointer PEi and the read pointer PLi. It is also designed to update each read pointer PLi by executing each firmware $40_i$. More precisely, in one simple variant of this particular embodiment of the invention, data to be read in the circular buffer memory $16_i$ must be read at the address indicated by the read pointer PLi; reading it must be blocked if an update to the read pointer PLi made previously by the read management module 30 is such that the address to which it points reaches or goes beyond the address to which the write pointer PEi points (memory empty).

Specifically, so that blocking and unblocking of read and write operations in any of the circular buffer memories $16_i$ can work as described above, the write management module 24 may be programmed for, after each update of a write pointer PEi:

blocking all data writes into the circular buffer memory $16_i$ if the write pointer PEi reaches the read pointer PLi (indication that the memory is full), and unblocking data reads in the circular buffer memory $16_i$ if this read was blocked and the write pointer PEi goes beyond the read pointer PLi again.

Similarly, the read management module 30 may be programmed for, after each update of a read pointer PLi:

blocking all data reads in the circular buffer memory $16_i$ if the read pointer PLi reaches the write pointer PEi (indication that the memory is empty), and unblocking data writes in the circular buffer memory $16_i$ if this write was blocked and the read pointer PLi goes beyond the read pointer PEi again.

In this way, the write management module 24 performs a write blocking function when the memory $16_i$ is full and a read unblocking function when the memory $16_i$ is empty and fills up once again. The read management module 30 performs a read blocking function when the memory $16_i$ is empty and a write unblocking function when the full memory $16_i$ becomes empty again.

Detailed operation of the write and read management modules 24 and 30 as described above is only one example embodiment of the write and read blocking means in the circular buffer memories $16_1, \ldots, 16_i, \ldots, 16_n$ using the write and read pointers PE1, ..., PEi, ..., PEn and PL1, ..., PLi, ..., PLn. But those skilled in the art would understand that other implementations or variants could be envisaged to make circular buffer memories $16_1, \ldots, 16_i, \ldots, 16_n$ with blocking reads and writes depending on the values of the write and read pointers PE1, ..., PEi, ..., PEn and PL1, ..., PLi, ..., PLn.

These features make the DMA controller 10 or 20 capable of synchronising incoming data flows from sources $12_1, \ldots, 12_j, \ldots, 12_n$ and outgoing flows to the addressee 14.

The result is that in an integrated circuit comprising several data sources $12_1, \ldots, 12_j, \ldots, 12_n$ that may for example be temporary local storage spaces for data processed or used by one or several microprocessors, the addressee 14 that may for example be a peripheral or any functional operator and the DMA controller conforming with its variant embodiment 20 including the circular buffer memories $16_1, \ldots, 16_i, \ldots, 16_n$, the microprocessor(s) may transfer data to the sources $12_1, \ldots, 12_j, \ldots, 12_n$ independently of transfers made by the DMA controller between these sources and the addressee 14.

Combined with this DMA controller synchronisation function, in another embodiment of the invention and according to a first variant it would be possible to define a new read pointer called the "working pointer" for each circular buffer memory $16_i$. This working pointer PTi is different from the previously defined read pointer PLi. Like it, it is stored in the storage means 38. It is variable and will be updated by the firmware $40_i$ after each read operation that it performs.

In FIGS. 3A and 3B that show a simple embodiment with two sources $12_1$ and $12_2$, two working pointers PT1 and PT2 are additional to the write pointers PE1, PE2 and read pointers PL1 and PL2. More precisely, FIG. 3A represents the circular buffer memory structure $16_1$ and FIG. 3B similarly shows the circular buffer memory $16_2$.

Each firmware $40_i$ can thus be defined such that the logic to update the working pointer PTi comprises at least one address jump in the circular buffer memory $16_i$ so as to be able to read data derived from the source $12_i$, in a different order from the sequence that it generates. By introducing this new pointer PTi and the possibility of making updates by forwards or backwards address jumps in each circular buffer memory $16_i$ as shown in FIGS. 3A and 3B, this buffer memory is not used like a simple FIFO type list. The working pointers PT1, ..., PTi, ..., PTn enable the DMA controller 10 or 20 to reorder each data sequence received from sources $12_1, \ldots, 12_i, \ldots, 12_n$ itself.

In this first variant, the read pointer PLi of any one of the circular buffer memories $16_i$ is then a read pointer releasing memory space to write data. In other words, every time that this read pointer is updated, the memory space between the location of the former pointed address and the location preceding the location of the new address pointed to by the read pointer PLi is automatically released for write. This is due to the fact that as mentioned above, the memory space located in the circular buffer memory $16_i$ between the address of the write pointer PEi and the address preceding the address of the read pointer PLi in the direction from the base towards the top is considered by principle as being free space for writing.

The working pointer PTi of any one of the circular buffer memories $16_i$ is itself a read pointer that keeps the read data. In other words, when data has to be read in the circular buffer memory $16_i$ so that it can be transmitted to the addressee 14, it is read at the address indicated by the working pointer PTi. But updating the working pointer PTi after this read does not release the corresponding elementary location for the write. Displacements of the working pointer PTi in read do not necessarily follow the sequence of data originating from the source $12_i$ in increasing order of addresses. They are freely predetermined by the firmware $40_i$ in an arbitrary order, preferably between the read pointer PLi and the write pointer PEi. In particular, depending on the application, data read a first time by the working pointer PTi may be reread and the data may be read in an order different from the order in which they are stored in the circular buffer memory $16_i$.

Therefore, in this variant embodiment in which each working pointer PTi is a read pointer, it can be seen that each firmware $40_i$ comprises instructions executed by the read management module 30 to update two read pointers associated with the circular buffer memory $16_i$:

instructions that may include forwards and/or backwards address jumps depending on the target application for the working pointer PTi, instructions that may include forwards address jumps only for the read pointer PLi, depending on programmed displacements for the working pointer PTi.

On the other hand, none of the firmwares $40_1, \ldots, 40_i, \ldots, 40_n$ comprises instructions to update the write pointers PE1, ..., PEi, ..., PEn, which may for example be updated by a sequencer without an address jump and incrementally in each data write operation in one of the circular buffer memories $16_1, \ldots, 16_i, \ldots, 16_n$.

It will also be noted that displacements of an arbitrary working pointer PTi must be programmed such that the pointer points into the circular buffer memory zone $16_i$ that effectively contains the data to be read, as shown in FIG. 3A. If one of the working pointers points outside this zone after an update (as shown in FIG. 3B), then either an error message can be generated or it can be blocked in this position until the write pointer PEi catches it up, depending on the target applications.

In one variant embodiment symmetric with the above, it would also be possible to define a new working pointer PTi as the write pointer for each circular buffer memory $16_i$ in order to reorder the data sequence.

In this second variant, the write pointer PEi for each circular buffer memory $16_i$ would be a write pointer with reserved memory space to write data in the circular buffer memory $16_i$. In other words, every time that it is updated, the memory space between the location of the former pointed address and the location before the new address pointed at by the write pointer PEi would be automatically reserved for the read. The working pointer PTi would be an effective write pointer for writing data in the memory space reserved by the pointer PEi in the circular buffer memory $16_i$, in a predetermined arbitrary order.

But this second variant is less attractive than the previous variant because it could generate blockages in the circular buffer memories $16_1, \ldots, 16_i, \ldots, 16_n$ at the data writing end. In an application to transfer data by a DMA controller, it is preferable to manage blockages downstream at the read end in the circular buffer memories rather than upstream at the write end.

We will now describe details of an example of a method for transferring data derived from two sources $12_1$ and $12_2$ for which data are to be interlaced that can be used by the DMA controller 10 or 20, with reference to the first variant embodiment mentioned above in which the DMA controller management blocks reads and writes in the circular buffer memories $16_1$ and $16_2$ and in which the working pointers PT1 and PT2 are introduced as read pointers that keep data read for each circular buffer memory. The successive steps in this method are shown in FIG. 4.

Figure 4:
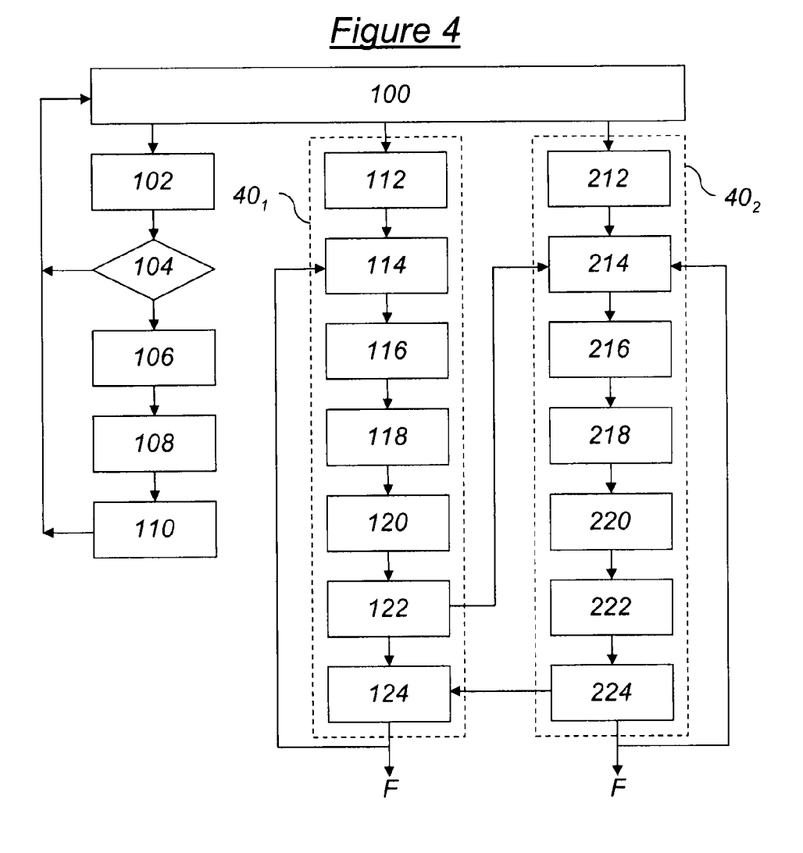
FIG. 4 shows the successive steps in a data transfer method, according to one embodiment of the invention.

This transfer method can be generalised to more than two sources and not only in a data interlacing application, but this particular example is given with reference to FIG. 4 in order to provide a simple explanation and illustration.

During the first step 100, the controller 10 or 20 is waiting for data read or write instructions in one of the circular buffer memories $16_i$ (in this example, i=1 or 2).

This step 100 is followed by a step 102 to start writing, on an instruction to write data in one of the circular buffer memories $16_i$. The write management module 24 is activated during this start writing step. As a non-limitative example embodiment, it extracts the value of a first descriptor of the circular buffer memory $16_i$ from the storage means 38, indicating whether or not writing into this buffer memory is blocked.

Then, depending on the value of this first descriptor, a test step 104 is done to decide on whether or not to continue writing the data considered in the circular buffer memory $16_i$. Step 100 will be repeated if the first descriptor indicates that the write is blocked, otherwise step 106 is used.

During step 106, the write management module 24 extracts the address to which the write pointer PEi points, from the storage means 38. It then writes the considered data in the corresponding elementary location in the circular buffer memory $16_i$.

Then during an update step 108, the address pointed to by the write pointer PEi is incremented by one elementary location in the circular buffer memory $16_i$.

Finally, during a step 110, the write management module 24 extracts the address to which the read pointer PLi points from the storage means 38, then possibly updates the value of the first write blocking descriptor and that of a second read blocking descriptor of the circular buffer memory $16_i$, in the following situations:

if the address pointed at by the write pointer PEi after the update in step 108 reaches the address pointed at by the read pointer PLi (indication that the memory $16_i$ is full), the first descriptor is modified so that it indicates that writes are blocked in the circular buffer memory $16_i$, if the address pointed at by the write pointer PEi after the update in step 108 is different from the address pointed at by the read pointer PLi, and the second descriptor indicates that reads are blocked, the second descriptor is modified so that it indicates that reads are authorised in the circular buffer memory $16_i$.

After step 110, step 100 is repeated.

Step 100 is also followed by a step 112 to start a read data sequence in the circular buffer memory $16_1$ following activation of the firmware $40_1$. This activation step is executed by the read management module 30. As a non-limitative example embodiment, it extracts the value of the second descriptor of the circular buffer memory $16_1$ from the storage means 38, indicating whether or not reading is blocked in this buffer memory.

Then, during a test step 114, the read management module 30 determines whether or not the addressee 14 is ready to receive data. This test may be made in several ways. If the DMA controller 10 or 20 comprises the output buffer 36, it may be considered that data can be transferred as long as the output buffer 36 is not full. By default or as a complement, a conventional communication protocol may allow that the addressee 14 informs the DMA controller 10 or 20 about its ability to receive data by messages in a predetermined format. If it is impossible to transfer data to the addressee 14, execution of the firmware $40_1$ remains blocked at step 114. The next step 116 is not started until the addressee is once again ready to receive data, either because the output buffer 36 is emptying or because the DMA controller receives a message informing it that the addressee can receive data.

Step 116 is another test step. During this step, depending on the value of the second descriptor, it is decided whether or not to continue reading data in the circular buffer memory $16_1$. If the second descriptor of this memory $16_1$ indicates that the read is blocked, execution of the firmware $40_1$ remains blocked at step 116, otherwise the next step 118 is done. The sequence remains blocked at step 116 as long as data written into the circular buffer memory $16_1$ does not change the value of its second descriptor (step 110).

Step 118 is a step in which the circular buffer memory $16_1$ is read and the working pointer PT1 is updated, and possibly the read pointer PL1 is updated in accordance with the instructions of the firmware $40_1$.

Then during a step 120, the read management module 30 possibly updates the value of the first write blocking descriptor and the second read blocking descriptor in the circular buffer memory $16_1$, in the following situations:

if the address pointed at by the read pointer PL1 reaches the address pointed at by the write pointer PE1 after the update in step 118 (indication that the memory $16_1$ is empty), the second descriptor is modified to indicate that reads are blocked in the circular buffer memory $16_1$, if the address pointed at by the read pointer PL1 is different from the address pointed at by the write pointer PE1 after the update in step 118 and the first descriptor indicates that writes are blocked, the first descriptor is modified so that it indicates authorisation of writes in the circular buffer memory $16_1$ The step 120 is followed by a step 122 to transmit a token T (or mutex) to firmware $40_2$.

Step 122 is followed by a step 124 to wait for the token T. The firmware $40_1$ remains blocked at this step as long as it has not received the token from another firmware currently being executed, in fact the firmware $40_2$. As soon as it receives the token T, a counter reading the data sequence originating from source $12_1$ is incremented and step 114 is executed again until the entire sequence has been read. When the entire required sequence has been read, execution of firmware $40_1$ terminates (F).

The step 100 is also followed by a step 212 to trigger reading a data sequence in the circular buffer memory $16_2$ following activation of the firmware $40_2$. This activation step is executed by the read management module 30. As a non-limitative example embodiment, it extracts the value of the second descriptor of the circular buffer memory $16_2$ from the storage means 38 indicating whether or not reading is blocked in this buffer memory.

Step 212 is followed by a step 214 waiting for the token T. The firmware $40_2$ remains blocked at this step as long as it has not received the token from another firmware currently being executed, in fact firmware $40_1$. As soon as it receives the token T, a test step 216 is started.

During this test step 216, the read management module 30 determines whether or not the addressee 14 is ready to receive data. This step is the same as the previously described step 114. Execution of the firmware $40_2$ remains blocked at this step as long as it is impossible to transfer data to the addressee 14.

The next step 218 is another test step. During this step, depending on the value of the second descriptor of the circular buffer memory $16_2$, it is decided whether or not to continue reading data. If the second descriptor of this memory $16_2$ indicates that read is blocked, execution of the firmware $40_2$ remains blocked at step 218, otherwise the next step 220 is started. The sequence remains blocked at step 218 as long as writing data into the circular buffer memory $16_2$ does not change the value of its second descriptor (step 110).

Step 220 is a step to read in the circular buffer memory $16_2$ and update the working pointer PT2 and possibly update the read pointer PL2 in accordance with the instructions of the firmware $40_2$.

Then, during a step 222, the read management module 30 may update the value of the first write blocking descriptor and the value of the second read blocking descriptor of the circular buffer memory $16_2$ in the following situations:

if the address pointed at by the read pointer PL2 reaches the address pointed at by the write pointer PE2 after the update in step 220 (indication that the memory $16_2$ is empty), the second descriptor is modified to indicate that reads are blocked in the circular buffer memory $16_2$, if the address pointed at by the read pointer PL2 is different from the address pointed at by the write pointer PE2 after the update in step 220 and the first descriptor indicates that writes are blocked, the first descriptor is modified so that it indicates authorisation of writes in the circular buffer memory $16_2$.

Step 222 is followed by a step 224 to transmit the token T to the firmware $40_1$. As soon as the token T has been transmitted, a read counter for the data sequence derived from the source $12_2$ is incremented and execution returns to the waiting step 214 until the entire sequence has been read. When the entire required sequence has been read, execution of the firmware $40_2$ is terminated (F).

Obviously, execution of firmwares for reading in the circular buffer memories and writing in the same circular buffer memories can be managed independently and in parallel by the DMA controller 10 or 20. This changes nothing about the sequence of data transmitted to the addressee that is determined by circulation of the token T (or more generally semaphores) between read firmwares.

It is thus quite clear that the direct memory access controller described above and its operation for data transfers makes it easy to manage data transfers from several sources to at least one addressee, respecting a predetermined order of the data to be transmitted by the DMA controller to the addressee.

It will also be noted that the invention is not limited to the envisaged embodiments. In particular, in the above it has been envisaged to use an application in which the transfer is made to a single addressee to simplify the description, but the principle of the invention is equally applicable if there are several addressees.

More generally, those skilled in the art will realise that several modifications could be made to the embodiments described above, after considering the information disclosed in the above. The terms used in the following claims must not be interpreted as limiting the claims to the embodiments presented in this description, but must be interpreted to include all equivalents that the claims aim to cover as a result of the way in which they are formulated and which could be predicted by those skilled in the art by applying their general knowledge to make use of the information that has just been disclosed to them.

The invention claimed is:

1. A direct memory access controller comprising:
   a transfer module that transfers data from several data sources to at least one addressee for these data, through several buffer memories;
   a read management module that reads data stored in the buffer memories and that transfers them in sequence to the addressee; and
   a storage module that stores read pointers associated respectively with each buffer memory, each read pointer indicating an elementary location of the buffer memory with which it is associated and in which data can be read,
   wherein the buffer memories are associated respectively with each data source, and
   for each buffer memory, the controller includes means for executing a firmware that reads data and updates a read pointer associated with this buffer memory,
   the controller includes means for synchronising execution of firmwares for at least two buffer memories as a function of a predetermined order of data originating from the at least two buffer memories required in an interlaced data sequence formed from the data originating from the at least two buffer memories to be transferred to the addressee, and
   wherein the means for synchronizing includes means for transmitting at least one read and update right from one firmware to another firmware, wherein holding a read and update right by one firmware currently being executed enables the one firmware to execute at least one data read in the buffer memory with which it is associated and at least one update of the corresponding read pointer.

2. The direct memory access controller according to claim 1, wherein each buffer memory includes a predetermined number of successive elementary locations, each buffer memory is circular, each elementary location of anyone of the circular buffer memories being identified by an address between a base address and a top address of this circular buffer memory, the storage module includes write pointers associated with each circular buffer memory and each indicating an elementary location of the buffer memory in which data can be written, and
   the controller also comprises a write management module that writes data received from sources in the corresponding circular buffer memories at addresses indicated by corresponding write pointers, and read and write blocking modules in each circular buffer memory that block read and write operations, respectively, based on the relative positions of the elementary locations indicated by said read pointer and said write pointer of each circular buffer memory, respectively.

3. The memory access controller according to claim 2, wherein the read blocking module in anyone of the circular buffer memories blocks any data read in this circular buffer memory when an update to the read pointer for this circular buffer memory results in the read pointer reaching or going beyond the address to which the write pointer for this circular buffer memory points, and wherein the write blocking module in any one of the circular buffer memories blocks any data write in this circular buffer memory when an update to the write pointer for this circular buffer memory results in the write pointer reaching or going beyond the address to which the read pointer for this circular buffer memory points.

4. The direct memory access controller according to claim 2, wherein, for each circular buffer memory the storage module includes a working pointer, different from said read pointer, associated with this circular buffer memory, this working pointer indicates an elementary location of the buffer memory in which data must be read, the firmware associated with this circular buffer memory also updates the working pointer at each read in this circular buffer memory, using a predetermined update logic.

5. The direct access memory controller according to claim 4, wherein the predetermined update logic for the working pointer of each circular buffer memory comprises at least one address jump in this circular buffer memory so as to read the data contained in the circular buffer memory in an order different from that in which the data were written.

6. A method comprising:
  transferring data from several sources to at least one addressee of these data, through several buffer memories, by a direct memory access controller, wherein each data received from anyone of the sources being transmitted by a write management module to a buffer memory associated with this source and each data to be transmitted to the addressee being read in one of the buffer memories by the controller, said transferring including,
  for each buffer memory, executing, by the controller, a firmware that reads the data from this buffer memory and updates a read pointer indicating an elementary location in this buffer memory in which data can be read, and
  synchronizing, by the controller, execution of firmwares for at least two buffer memories as a function of a predetermined order of data originating from the at least two buffer memories required in an interlaced data sequence formed from the data originating from the at least two buffer memories to be transferred to the addressee,
  wherein the synchronizing includes circulating at least one read and update right between the different firmwares currently being executed, wherein holding the read and update right by one of the firmwares currently being executed enables the one of the firmwares to execute at least one data read in the buffer memory with which the one of the firmwares is associated, and at least one update of the corresponding read pointer.

7. The method according to claim 6, wherein the circulating of the read and update right between the different firmwares currently includes:
  for each firmware execution, waiting for the read and update right according to a programmed instruction in this firmware,
  for each firmware execution, transmitting the read and update right to another firmware currently being executed after execution of at least one read and at least one update of the read pointer associated with this firmware, in accordance with a programmed instruction of this firmware.

8. A non-transitory computer readable storage medium encoded with instructions, which when executed by a direct memory access controller causes the direct memory access controller to implement a method comprising:
  transferring data from several sources to at least one addressee of these data, through several buffer memories, by the direct memory access controller, wherein each data received from anyone of the sources being transmitted—by a write management module to a buffer memory associated with this source and each data to be transmitted to the addressee being read in one of the buffer memories by the controller, said transferring including,
  for each buffer memory, executing, by the controller, a firmware that reads the data from this buffer memory and updates read pointer indicating an elementary location in this buffer memory in which data can be read, and
  synchronizing, by the controller, execution of firmwares for at least two buffer memories as a function of a predetermined order of data originating from the at least two buffer memories required in an interlaced data sequence formed from the data originating from the at least two buffer memories to be transferred to the addressee,
  wherein the synchronizing includes circulating at least one read and update right between the different firmwares currently being executed, wherein holding the read and update right by one of the firmwares currently being executed enables the one of the firmwares to execute at least one data read in the buffer memory with which the one of the firmwares is associated, and at least one update of the corresponding read pointer.

* * * * *